United States Patent
Huberman et al.

(10) Patent No.: US 10,573,273 B2
(45) Date of Patent: Feb. 25, 2020

(54) METHOD AND SYSTEM FOR DEVICE PLACEMENT BASED OPTIMIZATION TECHNIQUES

(71) Applicant: MAPSTED CORP., Mississauga (CA)

(72) Inventors: Sean Huberman, Guelph (CA); Paramvir Singh Nagpal, Brampton (CA)

(73) Assignee: MAPSTED CORP., Mississauga, Ontario (CA)

(*) Notice: Subject to any disclaimer, the term of this patent is extended or adjusted under 35 U.S.C. 154(b) by 0 days.

(21) Appl. No.: 16/007,162

(22) Filed: Jun. 13, 2018

(65) Prior Publication Data
US 2019/0385570 A1  Dec. 19, 2019

(51) Int. Cl.
*G06F 1/32* (2019.01)
*G06F 1/3206* (2019.01)
(Continued)

(52) U.S. Cl.
CPC .......... *G09G 5/10* (2013.01); *G01P 13/00* (2013.01); *G01V 7/02* (2013.01); *G06F 1/32* (2013.01); *G06F 1/3203* (2013.01); *G06F 1/3206* (2013.01); *G06F 1/3231* (2013.01); *G06F 1/3262* (2013.01); *G06F 3/0346* (2013.01); *H04W 52/0258* (2013.01); *G09G 2320/0626* (2013.01); *G09G 2320/08* (2013.01);
(Continued)

(58) Field of Classification Search
CPC ...... G06F 3/017; G06F 3/0346; G06F 3/0488; G06F 3/041; G06F 2200/1637; G06F 1/1694; G06F 1/3206; G06F 1/3231; G06F 1/3203; G06F 1/3234; G06F 1/3262; G06F 1/3215; G06F 1/3265; G06F 1/3287; H04L 67/22; H04M 15/58; G09G 2340/0492; G09G 2330/021; G01P 15/00; H04W 4/029; H04W 52/0254; H04W 52/0258
See application file for complete search history.

(56) References Cited

U.S. PATENT DOCUMENTS

| 8,117,471 B2 * | 2/2012 | Chin ............... G06F 1/1626 713/320 |
| 9,116,233 B2 | 8/2015 | Zanutta et al. |

(Continued)

FOREIGN PATENT DOCUMENTS

JP    2007085950 A    4/2007

*Primary Examiner* — Dismery Mercedes
(74) *Attorney, Agent, or Firm* — Henry L. Ohab

(57) ABSTRACT

A method and a device for determining a device placement to optimize techniques, such as power management techniques, are described. The method, executed in a processor of a mobile device, comprises gathering data from at least one sensor associated with the mobile device. Based on the data gathered from the sensor, a device placement indicative of at least one of an orientation and a position the mobile device may be determined. Further, details pertaining to the device placement may be integrated with secondary classification data comprising at least one of historical data, device orientation data, and device motion data. Based on the integrated details, it may be inferred whether a user is engaged with the mobile device. When a user is not engaged with the mobile device, a brightness of the display is lowered in at least one stage to optimize power consumption and user experience.

20 Claims, 5 Drawing Sheets

(51) Int. Cl.
  *G06F 1/3237*   (2019.01)
  *G06F 1/3203*   (2019.01)
  *G01P 13/00*    (2006.01)
  *H04W 52/02*    (2009.01)
  *G09G 5/10*     (2006.01)
  *G01V 7/02*     (2006.01)
  *G06F 1/3234*   (2019.01)
  *G06F 3/0346*   (2013.01)
  *G06F 1/3231*   (2019.01)
  *H04W 4/029*    (2018.01)

(52) U.S. Cl.
  CPC . *G09G 2330/021* (2013.01); *G09G 2330/022* (2013.01); *H04W 4/029* (2018.02)

(56) References Cited

U.S. PATENT DOCUMENTS

| | | | | |
|---|---|---|---|---|
| 9,179,251 B2* | 11/2015 | Zelinka | ............. | H04W 4/38 |
| 9,367,098 B2* | 6/2016 | Cheng | ............. | G06F 1/1694 |
| 9,684,775 B2* | 6/2017 | Gupta | ............. | G06F 21/31 |
| 10,037,074 B2* | 7/2018 | Goldsmith | ............. | G06F 1/3296 |
| 2009/0043504 A1 | 2/2009 | Bandyopadhyay et al. | | |
| 2011/0047368 A1* | 2/2011 | Sundaramurthy | .... | G06F 3/0481 |
| | | | | 713/100 |
| 2012/0100889 A1* | 4/2012 | Kim | ............. | G06F 1/1694 |
| | | | | 455/556.1 |
| 2012/0270609 A1* | 10/2012 | Luke | ............. | G06F 1/1626 |
| | | | | 455/566 |
| 2013/0029681 A1* | 1/2013 | Grokop | ............. | G01C 21/16 |
| | | | | 455/456.1 |
| 2013/0245982 A1* | 9/2013 | Buchanan | ............. | G01C 19/00 |
| | | | | 702/93 |
| 2014/0022223 A1* | 1/2014 | Jung | ............. | H04M 1/22 |
| | | | | 345/207 |
| 2014/0129175 A1 | 5/2014 | Poduri et al. | | |
| 2015/0022469 A1* | 1/2015 | Mhun | ............. | G06F 3/0416 |
| | | | | 345/173 |
| 2015/0089262 A1* | 3/2015 | Cairns | ............. | G06F 1/3203 |
| | | | | 713/323 |
| 2016/0191696 A1* | 6/2016 | Kozaczuk | ............. | G06F 3/041 |
| | | | | 455/405 |
| 2016/0322025 A1* | 11/2016 | Zhou | ............. | G09G 5/10 |
| 2016/0366654 A1* | 12/2016 | Dervisoglu | ............. | H04W 52/146 |
| 2016/0379074 A1 | 12/2016 | Nielsen et al. | | |
| 2017/0344175 A1* | 11/2017 | Hung | ............. | G06F 3/0488 |
| 2018/0018946 A1* | 1/2018 | Park | ............. | G06T 7/74 |
| 2018/0088797 A1* | 3/2018 | McAtee | ............. | G06F 3/04883 |
| 2018/0164942 A1* | 6/2018 | Huffman | ............. | G06F 1/3203 |

* cited by examiner

METHOD AND SYSTEM FOR DEVICE PLACEMENT BASED OPTIMIZATION TECHNIQUES

BACKGROUND

Portable mobile devices, such as smart phones and tablets have become ubiquitous. To ensure portability and ease of use, various techniques have been suggested and implemented to make device components efficient, owing to size and weight constraints associated with the portable mobile devices. Despite efficiency being achieved at a processor level, such devices often struggle to provide enhanced battery life or longer power consumption cycles. Among other components, a display unit or display of the device, may consume substantial power, especially in case of touch screen devices. While, the display may consume a major portion of available power, inappropriate power to the display may impact the functioning of the device.

DETAILED DESCRIPTION

Figure 1:
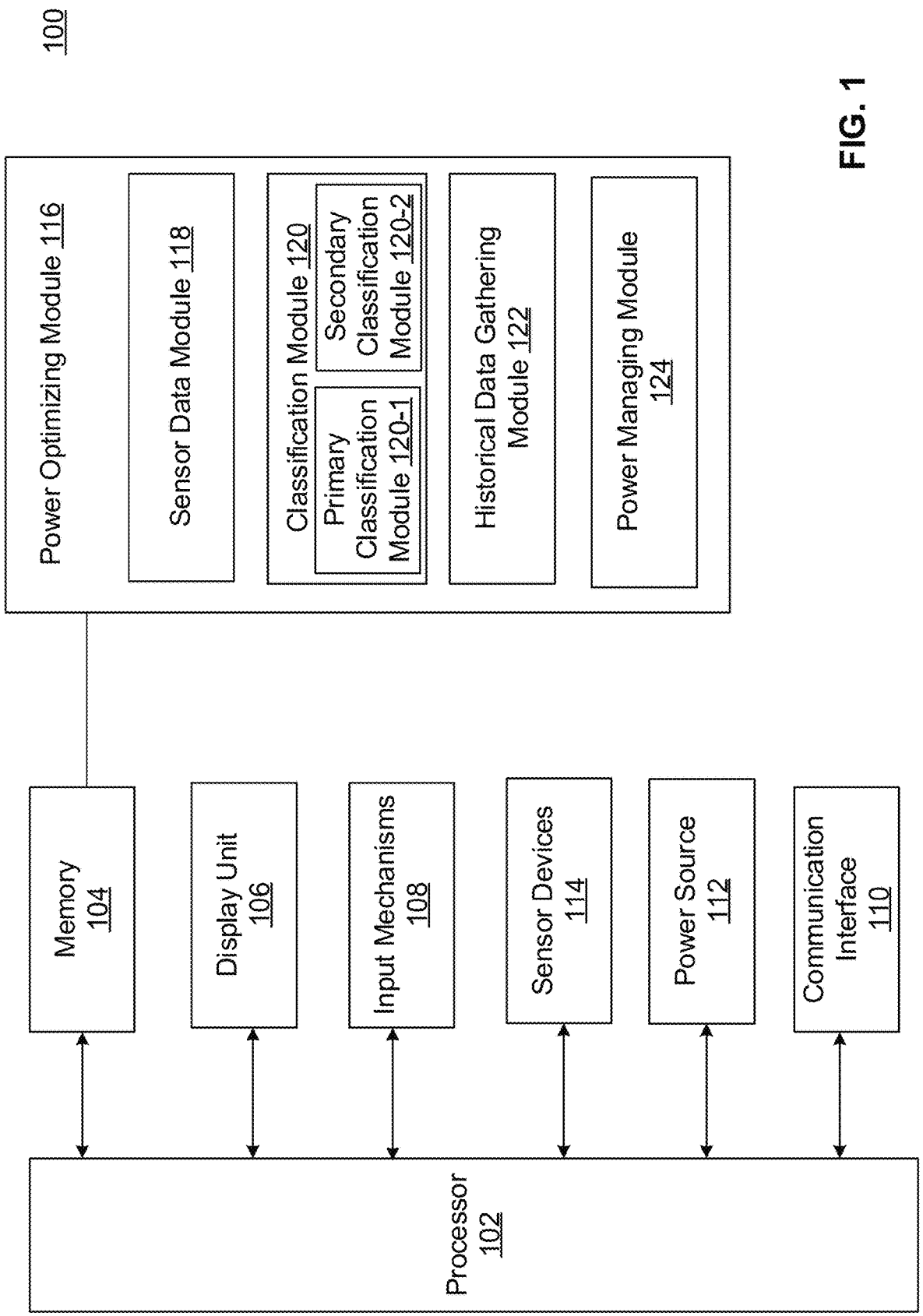
FIG. 1 illustrates, in an example embodiment, a system for controlling power to a display of a mobile device.

Among other benefits and technical effects, embodiments provided herein provide for efficient power management in a portable mobile device to better manage power resources without compromising on user experience. Examples of the portable mobile devices include, but are not limited to, personal digital assistants (PDAs), smart phones, wearable computing devices, mobile phones, and tablets.

According to an aspect of present subject matter, power to a display of the mobile device is controlled, based on whether a user is engaged with the mobile device or not. In an example, a device placement, which may indicate at least one of a position and an orientation of the device, may be determined to infer whether a user is engaged with the mobile device, hereinafter referred to as device. For instance, when a user is not looking at or interacting with the device, it may be determined that the user is not engaged with the device.

For instance, a user may be using a navigation app and may have a map displayed on the device. The map may indicate that the user has to walk straight for 500 m, so the user may keep the phone in hand but may not be looking at it. In such a case, power resources may be unnecessarily wasted by supplying power to the display, which is not being looked at by the user. The present subject matter provides for determining device placements to infer whether the phone is being used by the user, i.e., whether the user is engaged with the phone. On inferring that the phone is not being used, power to the display may be shut off.

The device placement is generally indicative of whether a user is using/engaged with the device. Referring to previous example, a phone in hand with a swinging motion indicates that the user is walking and most likely not looking at the phone. The swinging motion of the device may be determined based on analysis of data obtained from sensors associated with the device. This way data pertaining to various such placement positions of a device may be gathered and stored as placement classification data to be used as reference during run-time.

In operation, to control power to a display of the device, data from one or more sensors, such as accelerometer, gyroscope, and magnetometer, associated with the device may be obtained. The data may be processed, using signal processing techniques and statistical techniques to determine a device placement. Further, additional data, referred to as secondary classification data, may be obtained. The secondary classification data may include historical data associated with the device, device orientation data, and/or device motion data. The historical data includes details pertaining to user interaction behavior with the device, for instance, a placement position in which phone is generally held by a user, or an interaction input provided by the user in one of the power optimization sessions, where the device was put in a power optimization mode to control the power provided to the display.

Data pertaining to the device placement may be integrated with the secondary classification data, to infer whether the user is engaged with device or not. For instance, the device placement may indicate that device is facing downwards, i.e., screen is facing a surface, and such a placement may be inferred as not "not engaged", i.e., not being in use. However, in certain cases, the device may be held by a child in a stroller, who may be resting on the stroller and holding the device above him. In said case, the user may have provided an interactive input, last time the device was put in power optimization mode to indicate that the user is using the device. This historical data may be integrated with current device placement to intelligently infer that the user may still be engaged and a regular power consumption mode may be maintained. Likewise, other components of the secondary reference data may be integrated with the device placement to infer whether the user is engaged with the device.

In case it is inferred that the user is not engaged with the device, a power optimization mode be initiated, where power to the display may be controlled to lower a brightness of the display in a stage-wise manner to optimize power consumption. The stage-wise lowering of power may be understood as lowering the power in one or more time-based stages. In an example, the power may be controlled/lowered to lower the brightness to a first threshold for a first predetermined time period. Based on at least one of the device placement and a user interaction input in the first predetermined time period, the brightness is lowered to a minimum or a second threshold. For example, in case device's placement position remain unchanged and no interaction input, such as, a touch based or a key based input, is received from the user, the device may enter a subsequent stage of the power optimization mode, where the brightness is lowered to the second predetermined threshold. In other examples, more stages may be added or a direct power-off may be provided.

Thus, the present subject matters provide for intelligently determining a device's placement to infer whether the user is engaged with the device to optimize power consumption of the device. Additionally, owing to efficient analysis of data obtained from the sensors to determine device position data and integration with secondary classification data, the accuracy of determining whether the user is engaged or not is enhanced. Further, as against traditional systems of shutting off power, based on time-outs, the present invention may have a low response time, enhanced user experience, and a low false positive rate. For instance, in certain cases, the present subject matter may lower power to the display even before time-outs to better manage power. Furthermore, the present invention dynamically controls the power to optimize power consumption since it is independent of user action or inaction to control power, thereby enhancing user experience. The user-experience may also be enhanced owing to provision of stage-wise lowering of power, due to which power may not be abruptly shut off to the display but may be lowered over a period of time, thereby giving an opportunity to the user to act before the power is completely shut-off.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of mobile devices, including processor and memory resources. For example, one or more embodiments described herein may be implemented, in whole or in part, on mobile devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Provided herein is a computer implemented method for controlling power to a display of a mobile device for optimizing power consumption in the mobile device. The method includes gathering data from at least one sensor associated with the mobile device, determining a device placement, based on the data gathered from the at least one sensor, the device placement indicative of at least one of an orientation and a position the mobile device; integrating details pertaining to the device placement with secondary classification data, the secondary classification data comprising at least one of historical data, device orientation data, and device motion data, inferring whether a user is engaged with the mobile device, based on the integrated details, and when a user is not engaged with the mobile device, lowering brightness of the display in at least one stage to optimize power consumption and user experience.

In an example, lowering the brightness of the display further comprises lowering the brightness to a first predetermined threshold for a first predetermined time-period, determining whether the user has engaged with the mobile device in the first predetermined time-period, based on at least one of the device placement and a user interaction input, and when the user has not engaged with the mobile device in the first predetermined time-period, further lowering the brightness from the first threshold to a second predetermined threshold. Further, the method may comprise increasing the brightness from the first predetermined threshold to a predefined user selected brightness, when the user engages with the mobile device in the first predetermined time-period.

In another example, the method may also comprise upon lowering the brightness of the display, inferring whether the user is attempting to engage with the mobile device, based on at least one of the device placement and a user interaction input, and increasing the brightness of the display in at least one stage, when the user is attempting to engage with the mobile device.

A mobile device for controlling power to a display of the mobile device is also provided. The mobile device comprises a processor, and a memory storing a set of instructions. The instructions are executable in the processor to gather data from at least one sensor associated with the mobile device, determine a device placement, based on the data gathered from the at least one sensor, the device placement indicative of at least one of an orientation and a position the mobile device, integrate details pertaining to the device placement with secondary classification data, the secondary classification data comprising at least one of historical data, device orientation data, and device motion data, infer whether a user is engaged with the mobile device, based on the integrated details, and when a user is not engaged with the mobile device, lower brightness of a display of the mobile device in at least one stage to optimize power consumption and user experience.

System Description

FIG. 1 illustrates, in an example embodiment, a mobile device 100 for optimizing power consumption. In one embodiment, the mobile device 100 may correspond to, for example, a cellular communication device (e.g., smartphone, tablet, etc.) that is capable of telephony, messaging, and/or data computing services. In variations, the mobile device 100 can correspond to, for example, a tablet or a wearable mobile device. The mobile device 100 may include processor(s) 102, memory 104, a display unit 106, also referred to as display 106, input mechanisms 108, such as a keyboard or software-implemented touchscreen input functionality, barcode, QR code or other symbol- or code-scanner input functionality, a communication interface 110, and a power source 112. The power source 112 may provide power to various components, such as, the display 106 of the mobile device 100. The mobile device 100 may include sensor functionality by way of one or more sensor or sensor devices 114. The sensors 114 may include motion sensors, such as accelerometer, gyroscope, or magnetometer or other magnetic field sensing functionality, and barometric or other environmental pressure sensing functionality.

The mobile device 100, among other components, may include a power optimizing module 116. The power optimizing module 116 may include processor-executable instructions stored in RAM, in one embodiment, in the memory 104, and include as sub-modules, such as a sensor data processing module 118, a classification module 120, a historical data gathering module 122 and a power managing module 124.

Typically, a device is held in a certain specific way (device placement), defined by its corresponding device position and device orientation, when in use by a user. The term device position as used herein refers to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms. The device's orientation may provide the device's current rotated position which can be represented by three dimensions (e.g., Euler angles) or four dimensions (e.g., Quaternions). The device orientation may provide a rotation matrix for converting the device sensor data from the device's local coordinates to global coordinates (e.g., from X-Y-Z to North-East-Down).

To determine details pertaining to the mobile device's placement, data from the sensors 114 may be gathered. The sensors 114 may include inertial sensors, such as an accelerometer and a gyroscope, and other sensors, such as a magnetometer, a photo sensor (to detect ambient light), and an acoustic sensor.

The processor 102 uses executable instructions stored in the power optimizing module 116 to optimize power consumption in the mobile device 100, on receiving data gathered from the sensors 114, referred to as sensor data. In an example, the sensor data may be received by the sensor data processing module 118 of the power optimizing module 116. The sensor data processing module 118 may process the sensor data to extract meaningful information pertaining to device placement.

In an example, data gathered from each of the sensors 114 may have respective time-stamps so that data from different sensors can be time-correlated, for instance, for any given position along a trajectory of the mobile device 100. For example, the orientation, the magnetic field strength and direction, and position data can be time-correlated for any given position along a trajectory or trajectory segment of the mobile device 100, in accordance with the respective time-stamps. The position data may include details pertaining to location of the mobile device 100. In one embodiment, device orientation can be accomplished using a self-adapting Kalman filter which fuses the various sensor data (for example, accelerometer, gyroscope, and magnetometer data). In one embodiment, the Kalman filter monitors the bias and drift of the various sensors and incorporates the misalignment matrices, allowing for the device to self-calibrate, improving the accuracy over time. The misalignment matrices represent the inherent error in the sensor measurements which can be estimated and corrected. The misalignment matrix may be developed based on a relationship between misalignment errors and the impact such errors may have on a sensor's accuracy. For instance, the misalignment matrix for a gyroscope may correspond to an alignment matrix that corrects the gyroscopes to respond as if they were aligned with the global frame.

In an example embodiment, additional device data may also be determined. The additional device data may include step information or heading information. In one embodiment, step information can be inferred from device sensor data. This data may also be used to determine device placement and subsequent analysis to infer whether the user is engaged with the mobile device 100.

The sensor data processing module 118 may implement one or more signal processing techniques, such as dead reckoning, to process the sensor data for obtaining time-series based data inputs. The time-series based data inputs include, for example, a three dimensional (3D) vector estimates ($g_x$, $g_y$, $g_z$), 3D gravity vector angle changes ($\theta$), and phone orientation estimates, such as pitch and roll.

Based on the time-series based data inputs, one or more statistical features may be determined. The statistical feature may be used to extract similarity between different device placements. The statistical features include, for example, a mean, a standard deviation, a skewness, a cross-correlation, a root mean square, a zero crossing rate, a sum of absolute differences with respect to mean, and an energy spectral density. The sensor data processing module 118 may implement a statistical technique to determine a corresponding statistical feature. In an example, the sensor data processing module 118 may apply a moving time-windowing, which may dynamically adjust the required statistical feature, such as the mean and the standard deviation, based on a current window frame. As a result, the statistical feature can be processed in real-time based on recent history of measured data.

In one embodiment, sensor data processing module 118 may also implement a dynamic feedback algorithm, which may adjust to a person's walking style and pace by examining the person's walking patterns and history and utilizing a feedback mechanism. The heading (i.e. direction of travel) can be estimated by monitoring the angle that the device makes with respect to North, then correcting for device bias and drift.

The sensor data processing module 118 may provide processed sensor data to the classification module 120 for determining a device placement. The classification module 120 may include a primary classification module 120-1 and a secondary classification module 120-2. The primary classification module 120-1 may receive the processed sensor data and compare it with placement classification data to determine the device placement.

The placement classification data refers to pre-stored data, which is generated based on data trained using a machine learning technique, such as artificial neural networks (ANNs) to learn different device placements in which the user is not engaged with the device. The placement classification data may label one or more of device placements as "non-engaged". The placement classification data may be generated in a calibration stage, where statistical features gathered for a predetermined number of mobile devices may be determined and processed using artificial neural network(s). In other embodiments, the placement classification data may be generated using a probabilistic neural network (PNN), a multilayer perceptron, a feed-forward neural network, or any other suitable type of machine learning technique. Further, appropriate cross-validation techniques may be applied to reduce a statistical feature set until it is necessary and sufficient for obtaining an adequate accuracy/complexity trade off.

So, the placement classification data may include, for each of the device placement, details pertaining to one or more statistical features, time-series based inputs, and/or other sensor related data. In other words, the placement classification data may include details pertaining position and orientation of the device for each of the device placement. Further, the details pertaining position and orientation of the device may also be correlated over time to appropriately determine certain device placements, such as a swinging motion of the device. The device placement is explained in detail with reference to an example through FIG. 2a-FIG. 2d.

In one embodiment, the placement classification data may be stored in a database that is communicatively accessible by the mobile device 100 over a network via the communication interface 110. In another embodiment, the mobile device 100 may store the classification data.

Referring back to determining the device placement in real-time, the primary classification module 120-1 may obtain the processed sensor data and a corresponding device placement may be determined using placement classification data. Device placement may be, for example, in-hand placement in portrait mode, an in-hand placement in landscape mode, a device over the ear placement, a swinging placement, an in-pocket placement, an in-bag placement, and a device facing a surface placement. It will be appreciated that this is a non-exhaustive list of device placements and, based on available placement classification data more positions may be determined.

Further, it may be determined whether the identified device placement is labelled as "not-engaged". If, the device placement is labelled as "not-engaged", to accurately infer whether the user is engaged or not, another level of classification may be performed. For subsequent classification, the secondary classification module 120-2 may obtain secondary classification data pertaining to the mobile device 100. The secondary classification data may include at least one of historical data associated with the mobile device, device position data and device orientation data. The device position data and the device orientation data may be determined based on the processed sensor data. The historical data may be determined by the historical data gathering module 122.

The historical data may comprise details pertaining to user interaction behavior with respect to a given position and orientation (or device placement) of the mobile device 100. The historical data may be gathered and provided by the historical data gathering module 122. The historical data may comprise short-term historical data and the long-term historical data, the long-term historical data being based on the short-term historical data gathered over time or predetermined number of power optimization sessions. The short-term historical data may include user inputs provided in the same (current) power optimization session.

In an example, based on analysis performed by the power optimizing module 116, it may be inferred that the user is not engaged with the mobile device 100 and accordingly the power to the display may be controlled, for instance, shut-off. However, the user may be using the mobile device 100, which was erroneously inferred to be to not in use, and provide an interaction input to indicate that the device is in use. Such user inputs for a current power optimization session may be detected and stored as short-term historical data.

This may happen in cases, where a user may hold the mobile device 100 in a device placement, which may be similar to a device placement when a user is not using it, for example, with a depth vector ($g_z$) in a direction facing the floor. Conventionally, when the depth vector is in a direction of the floor, it may be inferred that the screen may be laying flat on a surface and the user is not engaged with the device. However, this may not be true, when the user is lying on a surface and watching a video and there may be no user interaction input for a while. In said example, it may be inferred that the user is not engaged owing to the position and orientation of the device, and the mobile device 100 may enter the power optimization mode. At this point, the user may intervene and provide an interaction input, such as, a touch based input, a gesture based input, or a key based input to indicate that the mobile device 100 is being used. To address such scenarios, the user interaction behavior with the mobile device 100 may be recorded, for instance, as short-term historical data and used to further refine the process for inferring whether the user is engaged with the mobile device 100. The user interaction behavior may include details pertaining to such interactions, when the mobile device 100 is put in the power optimization mode.

In other examples, the historical data may also include other contextual information associated with the user interactions, such as location of the mobile device 100 and/or time of the day. So, it may be determined that user generally uses the mobile device 100 in a given device placement, when at home or in a mall. The historical data may include a user profile, which may indicate a user interaction behavior or pattern with the mobile device 100, based on various contextual factors, such as day, time of the day, and location.

The historical data gathered by the historical data gathering module 122 for a predetermined number of power optimizing sessions or over a predetermined time period may constitute long-term historical data. In other words, the short-term historical data gathered over time/predetermined power optimization sessions may constitute the long-term historical data.

This way the secondary classification module 120-2 may integrate the details pertaining to the device placement with the historical data to infer whether the user is engaged with the mobile device 100. Likewise, the device position data and the device orientation may be integrated with the device placement.

For example, the device orientation may indicate whether the mobile device is held in portrait mode or landscape mode, is facing away or towards a user. This information may be integrated with details obtained regarding the device placement to appropriately infer whether the device is being used. For instance, device in portrait mode, when integrated with device placement details indicates that the device 100 is in motion and "in pocket", help further establishing that the device 100 is "in pocket" and therefore, may not be in use. So, in certain cases combining the orientation details with device placement help in appropriate determination that the user is not engaged. Thus, the device orientation and the device position may provide details pertaining to device's location and orientation, for instance, direction and angle of various vectors, such as gravity vector, which may help in further refining the device's placement.

Upon integrating with the secondary classification data, the classification module 120 may infer whether the user is engaged with the mobile device 100. For instance, for a device placement labeled as "not engaged" if the historical data indicates that in such a device placement, the user was engaged in last session(s), it may be inferred that the user is engaged and the power optimization mode may not be initiated and a regular or user selected power consumption mode may be maintained.

However, in case it is inferred that the user is not engaged with the mobile device 100, an input may be provided to the power managing module 124 to put the mobile device in a power optimization mode, where a brightness of the display 106 is lowered in at least one stage. On receiving the input, the power managing module 124 may control the power to the display 106 to control the brightness of the display 106 and thus, the power consumption. In an example, the power managing module 124 may first lower the brightness to a first predetermined threshold for a first predetermined time period. In case an interaction input is received from the user and/or the device placement changes in the first predetermined time period, the mobile device 100 may exit the power optimization mode, and the power managing module 124 may increase the brightness from the first predetermined threshold to a predefined user selected brightness (i.e., last brightness settings). Such stage wise power optimization helps in enhancing user experience as the user is provided with an opportunity to exit the power optimization mode before the power is completely shut-off to indicate that the user is actually engaged with the mobile device to prevent inadvertent shutting off of the display 106.

In case no interaction input is received from the user during the first predetermined time period, the power managing module 124 may move the power optimization session to a subsequent stage, where power may be further lowered to a second predetermined threshold, which may be correspond to minimum brightness. The brightness may be lowered gradually over a second predetermined time period or the power may be completely shut-off instantly. In other examples, more stages may be added or the power may be regulated in a single stage only.

Once, in the power optimization mode, a regular power consumption mode may be initiated on receiving one of a user interaction input and/or based on the device placement. For instance, while in the power optimization mode, if the classification module 120 determines that the device's placement has changed to a placement labeled as "engaged", or a user provides an interaction input, the power managing module 124 may exit the power optimization mode in at least one stage. For example, first the brightness may be increased to a third predetermined threshold for a third predetermined time period. In case the device placement changes to 'engaged' in the third predetermined threshold and/or a user interaction is received, the power managing module 124 may increase the brightness to a fourth threshold, which may correspond to the user selected brightness. However, in case the device's placement corresponds to "not-engaged" and/or no user interaction input is received, the power managing module 124 may resume the power optimization mode.

For example, the power optimization mode may have been initiated on determining that the mobile device 100 is in "in pocket" device placement. Further, the classification module 120 may now determine that the mobile device 100 is no longer "in pocket" device placement but is in "in-hand" device placement and on integrating with the secondary classification data, it may be inferred that the user may be engaged. Accordingly, the power managing module 124 may initiate the regular power consumption mode in at least one stage as described above. Alternatively, despite of being in hand, it may be inferred that the user is still not engaged, the power managing module 124, in said case, may resume the power optimization mode.

Figure 2A:
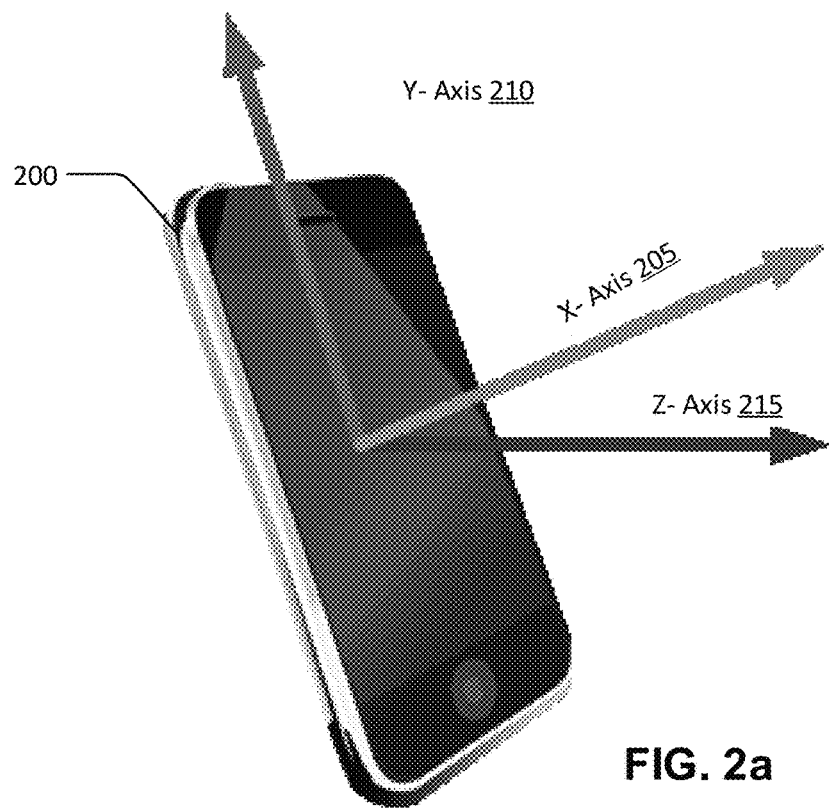
FIG. 2a and FIG. 2b schematically illustrates, in an example embodiment, a coordinate system for the mobile device and an angle between two vectors, respectively.
Figure 2B:
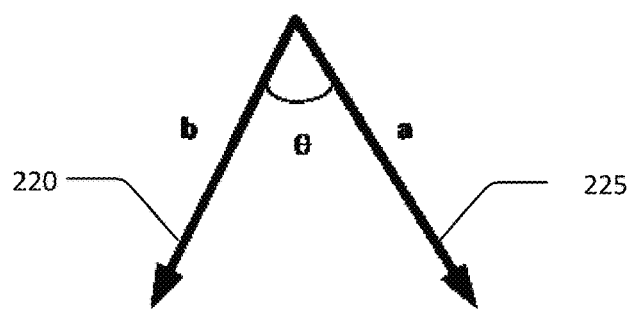

FIG. 2a schematically illustrates, in an example embodiment, a coordinate system for the mobile device, such as a phone 200, and FIG. 2b illustrates, in an example embodiment, an angle between two vectors associated with the phone 200. As mentioned above, the device placement may include details pertaining to a device's position and orientation. In an example, the device's position may be defined with respect to cartesian coordinate system, with x-axis 205 extending towards right of the phone 200, y-axis 210 extending towards top, and z-axis 215 extending outwards from the phone 200. It will be appreciated that coordinate system illustrated in FIG. 2a is only for the purpose of illustration and in other embodiments, any other coordinate system may be used or the cartesian coordinate system may be defined differently. Using the coordinate system, 3D vector estimates may be determined. Similar to position, orientation may be determined using angle, θ, between two vectors, say, vector a 220 and vector b 225, as illustrated in FIG. 2b. The details pertaining to position and orientation may aid in determining various device placements, for instance, a swinging motion, as explained in reference to FIGS. 2c-2d.

Figure 2C:
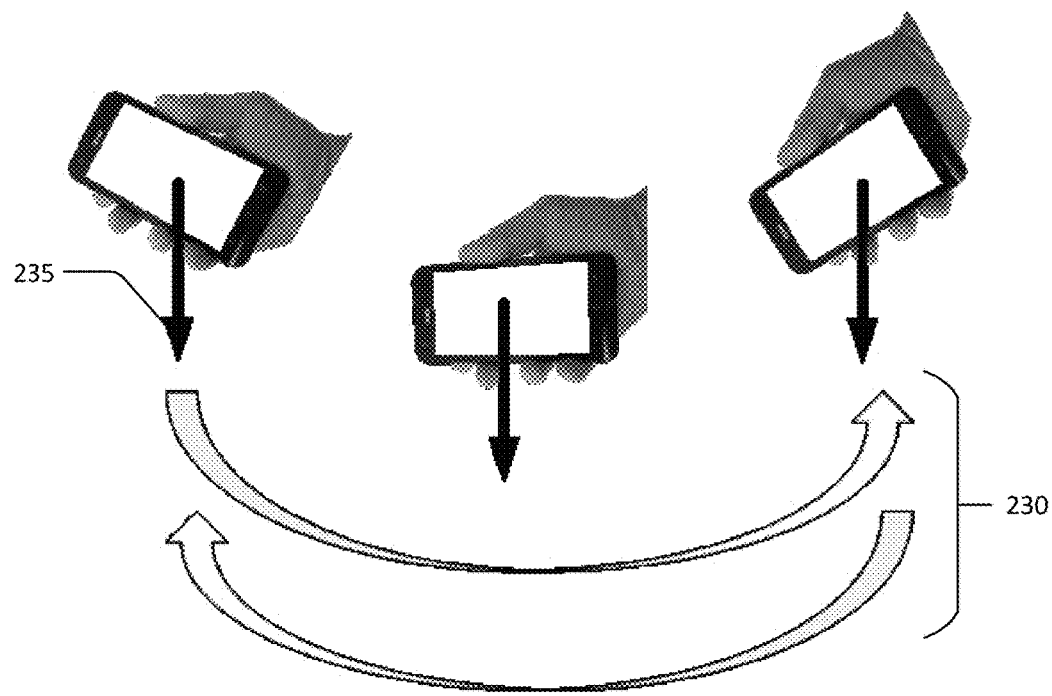
FIG. 2c and FIG. 2d illustrate, in an example embodiment, a motion of the mobile device and an associated gravity vector in a swinging in hand placement, respectively.
Figure 2D:
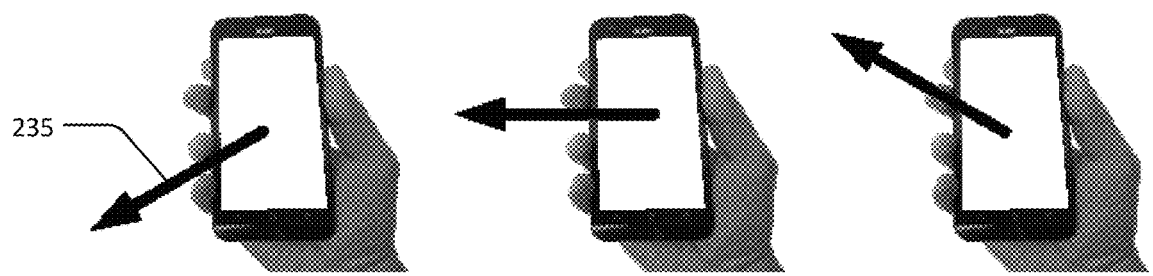

FIG. 2c and FIG. 2d illustrate, in an example embodiment, a swinging motion 230 of the mobile device and an associated gravity vector 235 in a swinging-in hand placement. FIG. 2c illustrates that as the phone 200 moves (swings) in hand, a phone angle with respect to gravity, θ, changes as the gravity vector 235 moves. The motion of gravity vector from a sensor of phone 200 perspective is illustrated in FIG. 2d. As can be seen, as the phone 200 swings, angle of gravity vector changes. Details pertaining to the gravity vectors and associated angles may be provided by the sensors 114 to the power optimizing module 116, for instance, to the sensor data processing module 118, which may further process obtained data to determine a current device placement.

Similar to swinging motion device placement, other device placements may be determined using one or more sensors 114. For instance, in "in pocket" device placement, the phone 200 tends to be in a vertical position (i.e., with gravity along the +/−y axis) and it tends to experience minimal movement (because the pocket keeps it in place). So, while it may be experiencing some linear movement in a given direction, it does not move much in the opposite direction. As well, while the user is walking, the pitch of the device (i.e., rotations about the x-axis) will experience a periodic behavior based on the steps being taken. All these position and orientation details may be captured using the sensor(s) 114 and compared against the placement classification data to determine placement as "in pocket" placement. In an example, for determining "in-pocket" placement, in addition to inertial sensors, photo sensors may be also used. Likewise, for determining, "in bag" placement, inertial sensors and an acoustic sensor may be used. Thus, the present subject matter provides for intelligently determining device placements, which may help in inferring whether a user is engaged with the mobile device 100 to subsequently optimize power consumption of the mobile device 100.

Methodology

Figure 3:
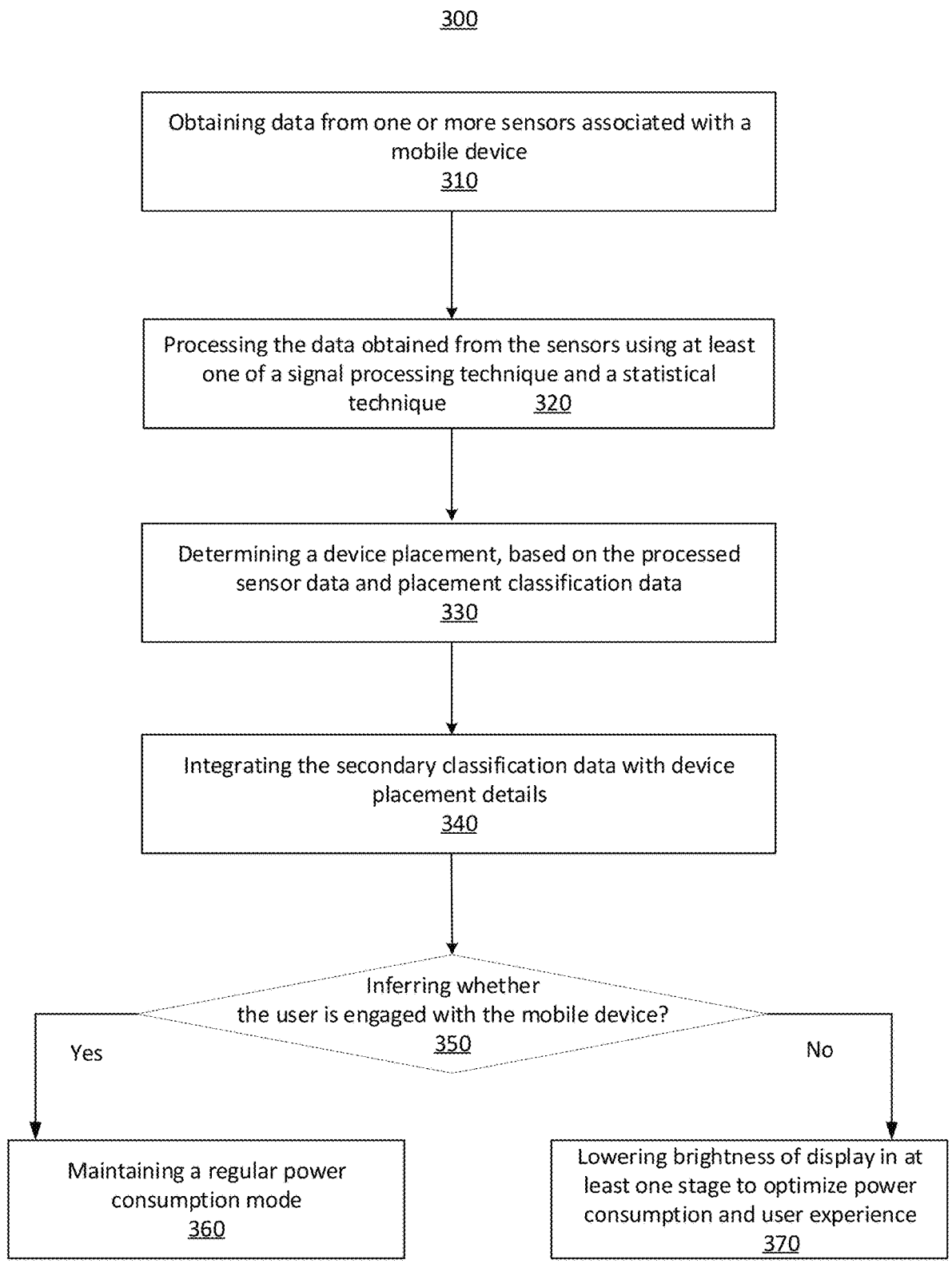
FIG. 3 illustrates, in an example embodiment, a method of controlling power to a display of a mobile device.

FIG. 3 illustrates, in an example embodiment, a method of optimizing power in a mobile device. In describing examples of FIG. 3 and FIG. 4, reference is made to the examples of FIGS. 1-2 for purposes of illustrating suitable components or elements for performing a step or sub-step being described.

Examples of method steps described herein are related to the use of the mobile device 100. According to one embodiment, the techniques are performed the processor 102 executing one or more sequences of software logic instructions that constitute the power optimizing module 116 of the mobile device 100. In embodiments, the power optimizing module 116 may include the one or more sequences of instructions within sub-modules including a sensor data processing module 118, a classification module 120, a historical data gathering module 122, and a power managing module 124. Such instructions may be read into the memory 104 from machine-readable medium, such as memory storage devices. Execution of the sequences of instructions contained in the sensor data processing module 118, the classification module 120, the historical data gathering module 122, and the power managing module 124 in the memory 104 causes the processor 102 to perform the process steps described herein. It is contemplated that, in some implementations, some of the sub-modules, or any other portions of executable instructions constituting the power optimizing module 116 may be hosted at a remote device rather than the mobile device 100. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, obtaining data from one or more sensors, such as the sensors 114, associated with a mobile device. The sensors may include inertial sensors, such as an accelerometer and a gyroscope, and other sensors, such as magnetometer, photosensor, and an acoustic sensor. The data from the sensors 114 may provide details pertaining to position of the mobile device 100, an orientation of the mobile device 100, and details pertaining to ambient environment, such as noise and light conditions.

At step 320, processing the data obtained from the sensors 114, referred to as sensor data, by the sensor data processing module 118. The sensor data processing module 118 may implement at least one of a signal processing technique and a statistical technique to determine position and orientation of the mobile device 100. Using the signal processing techniques time-series based data inputs may be obtained, which may be further processed using statistical technique.

At step 330, upon the processor 102 executing the instructions of the sensor data processing module 118, determining a device placement, based on the processed sensor data and placement classification data by the classification module 120. Further, it may be determined whether the determined device placement is labeled as "not engaged" indicating that the user may not be engaged with the mobile device 100. Further, classification may be performed, when the device placement corresponds to one of the device placements labelled as "not engaged".

At step 340, integrating the secondary classification data with the device placement by the classification module 120. The classification module 120 may gather the secondary classification data comprising at least one of the historical data, the device position data, and the device orientation data. The historical data may include user interaction behavior with the mobile device 100, such as inputs provided by the users, to prevent the mobile device from entering the power optimization mode. Likewise, in other example, the device position/motion data and/or the device orientation data may be integrated with the phone placement details.

At block 350, inferring whether the user is engaged with the mobile device 100, based on the integrated data. For instance, for the device placement identified at step 330, it may be determined whether the historical data includes something of interest (like user input for exiting power optimization mode) for the identified device placement and accordingly an inference may be generated.

If at block 350, it is inferred that the user is engaged with the mobile device, the method 300 proceeds to step 360, where a regular power consumption mode may be maintained. However, if at block 350, it is inferred that the user is not engaged, then at step 370, lowering brightness of the display 106 in at least one stage to optimize power consumption and user experience. For instance, the brightness may first be lowered to a first predetermined threshold for a first predetermined time period and in case no user interaction input is received in the first predetermined time-period and the device's placement remains unchanged, the brightness may be further lowered to a second predetermined threshold, such as a minimum brightness. In other examples, more stages may be added or the power may be dropped in a single stage only.

This way on intelligently inferring when the user is not interacting with the mobile device 100, the mobile device may be moved to a power optimization mode, where the brightness of the display 106 is lowered in a stage-wise manner to optimize use of the power source 112.

Figure 4:
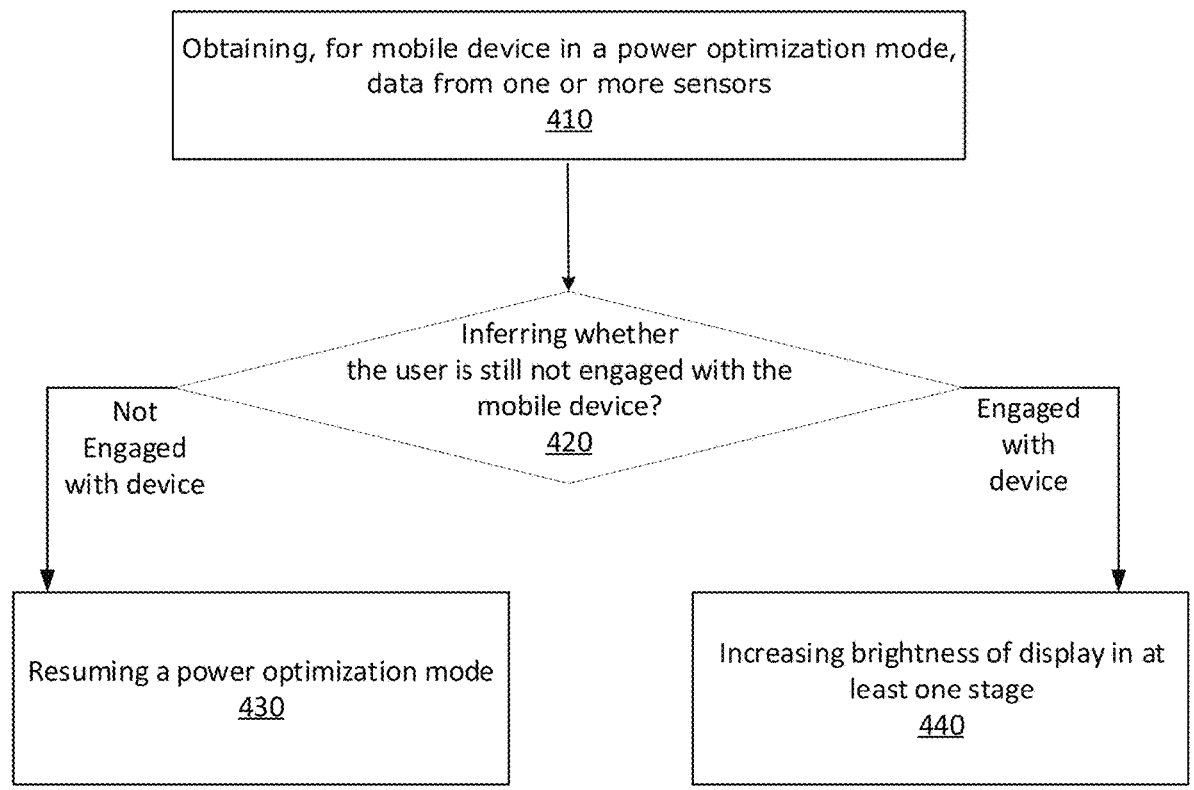
FIG. 4 illustrates, in an example embodiment, a method of exiting a power optimization mode.

FIG. 4 illustrates, in an example embodiment, a method of exiting a power optimization mode of a mobile device initiated using method of FIG. 3. At step 410, obtaining, for the mobile device 100 in the power optimization mode, data from one or more sensors 114 as discussed above.

At step 420, inferring, based on the sensor data, whether the user is still not engaged with the mobile device. For the purpose, it may be determined whether the device placement has changed to a placement position, which is not labelled as "not engaged", or, in other words, to a device placement labelled as "engaged". In case it is inferred that the user is still not engaged, at step 430, the power optimization mode is resumed.

However, if at block 420 it is inferred that the user may be engaged, at block 440, increasing a brightness of the display 106 in at least one stage. For instance, the brightness may be increased to a predetermined threshold for a predetermined time period. In case a user input is not received in the predetermined time period, the mobile device may again be put in the power optimization mode to optimize power consumption. On the other hand, when a user input is received, the brightness may be increased to the another threshold, such as a maximum brightness or user selected brightness settings to optimize user experience.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of controlling power to a display of a mobile device, the method implemented in the mobile device and comprising:
gathering data, by a processor of the mobile device, from at least one sensor associated with the mobile device;
obtaining placement classification data including data pertaining to at least one of a position and an orientation of the mobile device for a plurality of device placements of the mobile device;

determining, by the processor, a device placement from the plurality of device placements, based on the data gathered from the at least one sensor and the placement classification data, the device placement indicative of at least one of the orientation and the position the mobile device;

obtaining, by the processor, additional classification data comprising historical data pertaining to the mobile device, the historical data comprising details pertaining to a user interaction behavior with respect to determined device placement of the mobile device, wherein the historical data is generated by:

whenever the mobile device is put in a state of reduce power consumption, determining, for a corresponding device placement of the mobile device, if an interaction input is provided by a user indicating that the user is still engaged with the mobile device; and based on the determining, populating the historical data associated with the corresponding device placement with the user behavior indicating whether the user engages with the mobile device in the corresponding device placement;

inferring, by the processor, whether the user is engaged with the mobile device, based on the determined device placement and the additional classification data; and when the user is not engaged with the mobile device, lowering, by the processor, a brightness of the display to optimize power consumption and user experience.

2. The method of claim 1 wherein lowering the brightness of the display further comprises:

lowering the brightness to a first predetermined threshold for a first predetermined time-period;

determining whether the user has engaged with the mobile device in the first predetermined time-period, based on at least one of the determined device placement and a user interaction input; and when the user has not engaged with the mobile device in the first predetermined time-period, further lowering the brightness from the first threshold to a second predetermined threshold.

3. The method of claim 2 further comprising increasing the brightness from the first predetermined threshold to a predefined user selected brightness, when the user has engaged with the mobile device in the first predetermined time-period.

4. The method of claim 1 wherein the method further comprises:

determining whether the determined device placement is labeled as 'not-engaged' in the placement classification data, the placement classification data being generated based on data trained using a machine learning technique to learn different device placements in which the user is not engaged with the device; and when the determined device placement is labeled as 'not-engaged', obtaining the additional classification data.

5. The method of claim 1 wherein the historical data comprises short-term historical data and the long-term historical data, the short-term historical data comprising user interaction inputs provided in a current power optimization session and the long-term historical data being based on the short-term historical data gathered over time.

6. The method of claim 1 further comprising:

processing the data gathered from the at least one sensor using a signal processing technique to determine a time series based data input; and extracting a time-series based statistical feature, based on the time series based data input, wherein the device placement is determined based on the time-series based statistical feature.

7. The method of claim 6 wherein the time series based data input comprises at least one of 3D gravity vector estimates, 3D gravity vector angle changes, and device orientation estimates, and the time-series based statistical feature is one of a mean, a standard deviation, a skewness, a cross-correlation, a root mean square, a zero crossing rate, a sum of absolute differences with respect to mean, and an energy spectral density.

8. The method of claim 1 further comprising:

upon lowering the brightness of the display, inferring whether the user is attempting to engage with the mobile device, based on at least one of the determined device placement and a user interaction input; and increasing the brightness of the display, when the user is attempting to engage with the mobile device.

9. The method of claim 8 wherein increasing the brightness of the display comprises:

increasing the brightness from a second predetermined threshold to a third predetermined threshold for a third predetermined time-period;

inferring whether the user has engaged with the mobile device in the third predetermined time-period, based on at least one of the determined device placement and the user interaction input; and when the user has not engaged with the mobile device in the third predetermined time-period, lowering the brightness from the third predetermined threshold to the second predetermined threshold.

10. The method of claim 9 further comprising when the user has engaged with the mobile device in the third predetermined time-period, further increasing the brightness of the display from the third predetermined threshold to a fourth predetermined threshold.

11. A mobile device for optimizing power consumption comprising:

a processor; and a memory storing a set of instructions, the instructions executable in the processor to:

gather data from at least one sensor associated with the mobile device;

obtain placement classification data including data pertaining to at least one of a position and an orientation of the mobile device for a plurality of device placements of the mobile device;

determine a device placement from the plurality of device placements, based on the data gathered from the at least one sensor and the placement classification data, the device placement indicative of at least one of the orientation and the position the mobile device;

obtain additional classification data comprising historical data pertaining to the mobile device, the historical data comprising details pertaining to a user interaction behavior with respect to determined device placement of the mobile device, wherein the historical data is generated by:

whenever the mobile device is put in a state of reduce power consumption, determining, for a corresponding device placement of the mobile device, if an interaction input is provided by a user indicating that the user is still engaged with the mobile device; and based on the determining, populating the historical data associated with the corresponding device placement with the user behavior indicating whether the user engages with the mobile device in the corresponding device placement;

infer whether the user is engaged with the mobile device, based on the determined device placement and the additional classification data; and when the user is not engaged with the mobile device, lower a brightness of the display to optimize power consumption and user experience.

12. The mobile device of claim 11 wherein to lower the brightness of the display, the memory further comprises instructions executable to:

lower the brightness to a first predetermined threshold for a first predetermined time-period;

determine whether the user has engaged with the mobile device in the first predetermined time-period, based on at least one of the determined device placement and a user interaction input; and when the user has not engaged with the mobile device in the first predetermined time-period, further lower the brightness from the first threshold to a second predetermined threshold.

13. The mobile device of claim 12 further comprising instructions executable to increase the brightness from the first predetermined threshold to a predefined user selected brightness, when the user has engaged with the mobile device in the first predetermined time-period.

14. The mobile device of claim 11 further comprising instructions executable to:

determine whether the determined device placement is labeled as 'not-engaged' in the placement classification data, the placement classification data being generated based on data trained using a machine learning technique to learn different device placements in which the user is not engaged with the device; and when the determined device placement is labeled as 'not-engaged', obtain the additional classification data.

15. The mobile device of claim 11 wherein in the historical data comprises short-term historical data and the long-term historical data, the short-term historical data comprising user inputs provided in a current power optimization session and the long-term historical data being based on the short-term historical data gathered over a predetermined number of power optimization sessions.

16. The mobile device of claim 11 further comprising instructions executable to:

process the data gathered from the at least one sensor using a signal processing technique to determine a time series based data input; and extract a time-series based statistical feature, based on the time series based data input, wherein the device placement is determined based on the time-series based statistical feature.

17. The mobile device of claim 16 wherein the time series based data input comprises at least one of 3D gravity vector estimates, 3D gravity vector angle changes, and device orientation estimates, and the time-series based statistical feature is one of a mean, a standard deviation, a skewness, a cross-correlation, a root mean square, a zero crossing rate, a sum of absolute differences with respect to mean, and an energy spectral density.

18. The mobile device of claim 11 further comprising instructions executable to:

upon lowering the brightness of the display, infer whether the user is attempting to engage with the mobile device, based on at least one of the determined device placement and a user interaction input; and increase the brightness of the display, when the user is attempting to engage with the mobile device.

19. The mobile device of claim 18 wherein to increase the brightness, the memory comprises instructions executable to:

increase the brightness from a second predetermined threshold to a third predetermined threshold for a third predetermined time-period;

infer whether the user has engaged with the mobile device in the third predetermined time-period, based on at least one of the determined device placement and the user interaction input; and when the user has not engaged with the mobile device in the third predetermined time-period, lower the brightness from the third predetermined threshold to the second predetermined threshold.

20. The mobile device of claim 19 wherein to increase the brightness, the memory comprises instructions executable to increase the brightness of the display from the third predetermined threshold to a fourth predetermined threshold, when the user has engaged with the mobile device in the third predetermined time-period.

* * * * *